United States Patent Office 3,121,724
Patented Feb. 18, 1964

3,121,724
AMINOALKYL ETHERS OF 6-HALOBENZYL-5-INDANOL AND 7-HALOBENZYL-4-INDANOL
Seymour L. Shapiro, Hastings on Hudson, and Louis Freedman, Bronxville, N.Y., and Kurt Weinberg, Arlington, Mass., assignors to U.S. Vitamin & Pharmaceutical Corporation, New York, N.Y., a corporation of Delaware
No Drawing. Filed Sept. 20, 1961, Ser. No. 139,371
8 Claims. (Cl. 260—294.7)

The invention relates to ether derivatives of benzyl-substituted 4- and 5-indanols. More particularly, it pertains to dialkylaminoalkyl ethers derived from benzyl-substituted 4- and 5-indanols, and includes correlated improvements and discoveries whereby novel compounds having useful characteristics are provided.

A principal object of the invention is to provide novel dialkylaminoalkyl ethers of benzyl-substituted 4- and 5-indanols.

Another object of the invention is the provision of acid addition salts and quaternary ammonium compounds of the dialkylaminoalkyl ethers of benzyl-substituted 4- and 5-indanols.

Other objects of the invention will in part be obvious and will in part appear hereinafter.

The invention accordingly comprises a composition of matter possessing the characteristics, properties, and the relation of components which will be exemplified in the composition hereinafter described, and the scope of the invention will be indicated in the claims.

The novel compounds of the invention are benzyl indanoxy ethers, and more particularly, dialkylaminoalkyl ethers represented by the following formulae:

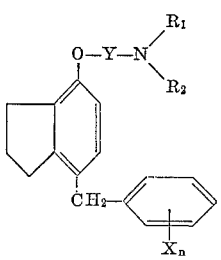 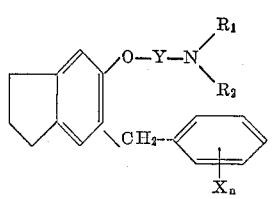

X is halogen and $n$ is zero or an integer of from one to five. When $n$ is 0, the benzene ring contains only hydrogen atoms attached to the carbon atoms. X can for example be fluorine, chlorine, bromine, or iodine, and preferably, when mono-substituted, is in the ortho or para position. In the preferred embodiment of this invention, X is chlorine and $n$ is an integer from 1–2. $R_1$ and $R_2$ are organic radicals having from one to ten carbon atoms selected from the group consisting of alkyl, alkenyl, cycloalkyl, and aralkyl groups, and can be alike or different, such as methyl, ethyl, isopropyl, n-propyl, hexyl, octyl, 2-ethylhexyl, nonyl, decyl, isobutyl, amyl, isoamyl, benzyl, α-phenethyl, cyclohexyl, cyclopentyl and cycloheptyl, forming with the attached nitrogen such radicals as dimethylamino, isopropylethylamino, diisopropylamino, methylethylamino, methyl isopropylamino, diethylamino, di-n-propylamino, di-tert-butylamino, diamylamino, dibenzylamino, methyl benzylamino, n-butyl cyclohexylamino, n-pentyl cyclopentylamino, methyl cyclohexylamino, and ethylbenzylamino. The tertiary amino radical —$NR_1R_2$ includes those radicals in which $R_1$ and $R_2$ are joined directly or through an oxygen atom to form N-heterocyclic radicals having 5 to 7 ring atoms, illustrated by 1-piperidino, 2-methyl-1-piperidino, 1-pyrrolidino, 1-hexamethylenimino, 4-morpholino, and the like. The tertiary amino radical —$NR_1R_2$ also includes, e.g., arylalkyl amine structures such as 1-indolino and tetrahydroisoquinolino.

Y is a bivalent alkylene group containing 2 to 3 carbon atoms in a straight chain, or in a branched chain, such as ethylene, propylene and trimethylene.

The basic tertiary nitrogen provides a center of reactivity for the preparation of acid addition salts and quaternary ammonium salts of the ethers, and such salts are within the purview of this invention.

In the practice of the invention, an indanol is reacted in a suitable condensing medium with a dialkylaminoalkyl halide, according to the following equation indicating as the illustrative reaction between 6-p-chlorobenzyl-indan-5-ol and dimethylaminoisopropyl chloride:

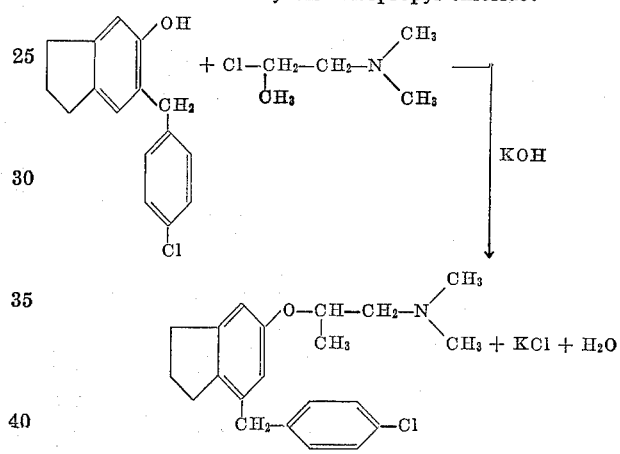

The acid acceptor can be any alkaline compound, such as sodium hydroxide, potassium hydroxide, sodamide, sodium methoxide, potassium amide, and the like. Various organic solvents, e.g. methanol, ethanol, propanol, and acetonitrile, or mixtures of solvents such as ethanol and water can be used. We prefer to use ethanol-water and potassium hydroxide as the acid acceptor.

The resultant bases, the dialkylaminoalkyl ethers of the indanols, can be reacted with any pharmaceutically acceptable inorganic and organic acid to form salts such as hydrochlorides, hydrobromides, nitrates, sulfates, phosphates, acetates, formates, tartrates, malates, theophyllinates, 8-chlorotheophyllinates, and the like. Similarly, through the use of selected quaternizing agents, such as methyl iodide, methyl p-toluene-sulfonate, ethyl bromide allyl bromide, ethyl bromoacetate, and the like, quaternary salts of the novel compounds are readily prepared. These salts are represented by $R_3A$ in Tables I and II, where $R_3$ is selected from the group consisting of hydrogen and an organic radical having from one to eight carbon atoms, such as methyl, ethyl, propyl, butyl, octyl, allyl, pentyl, benzyl and carboethoxyalkyl, e.g., carboethoxymethyl, and A is a nontoxic anion, such as bromide, iodide, chloride and p-toluenesulfonate.

In the preparation of the compounds wherein $R_1R_2N$— is derived from the base indoline, it is necessary to use a somewhat different synthetic route. When the alcohol 2-(N-indolinyl)ethanol is treated with thionyl chloride, a black, unworkable mass forms which does not yield acceptable quantities of the desired 2-(N-indolinyl)ethyl chloride. Instead, the indanol is converted to the 2-(4 or 5)-indanoxy)ethyl halide and this reacted with indoline to yield the compound of the formula shown in Table I, Compound 19 and Table II, Compound 16.

The unsubstituted indanols are commercially available. The benzylated indanols are readily prepared using the required benzyl halide with zinc chloride as a condensing agent following Buu-Hoï amd Demerseman (J. Org. Chem. 20:1129 (1955)). The exact position of the entering benzyl group has not been ascertained. However, in the zinc chloride catalyzed benzylation of a phenol, entry is preferably in the para position, and for the mono-benzylated-4-indanol, the product is believed to be 7-benzyl-4-indanol:

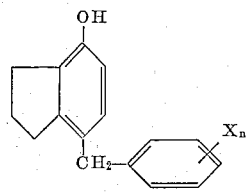

Alternatively, in the case of the monobenzylated 5-indanol, since the para position is occupied by one of the elements of the ring attached to the benzene nucleus, the initial entering benzyl group occupies a position ortho to the phenolic hydroxyl, and we believe that the more sterically accessible 6-position is attacked:

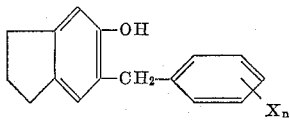

to afford the 6-benzyl-5-indanol. $X_n$ in the above formulae is as defined above.

It may be mentioned, however, that while these entering group assignments have been made in view of related mechanisms, the alternative structures to those given above for the mono-benzylated indanol, namely, 5-benzyl-4-indanol (from the 4-indanol) and 4-benzyl-5-indanol (from the 5-indanol), are to be considered as possibilities.

As illustrative of compounds of the invention, the following examples are presented:

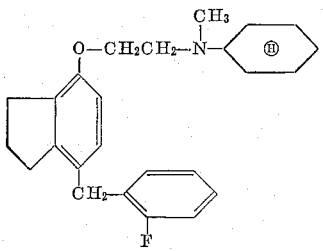

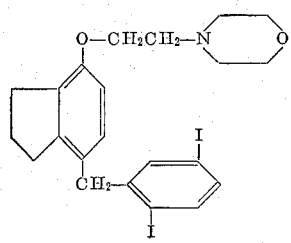

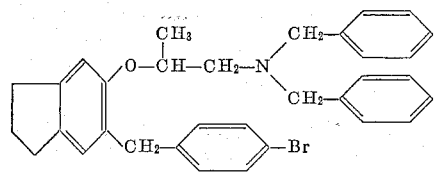

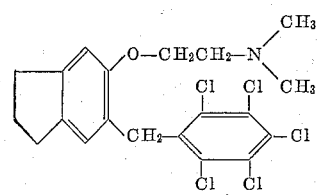

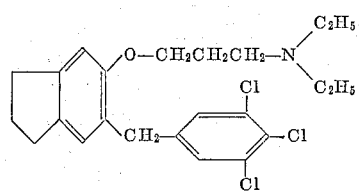

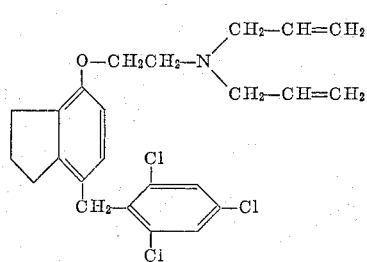

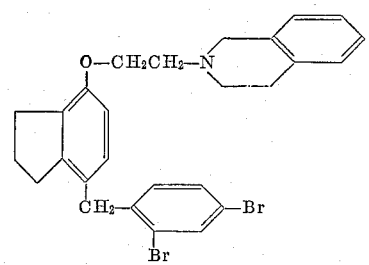

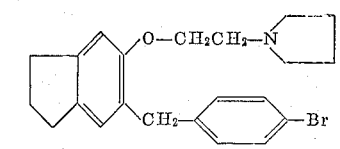

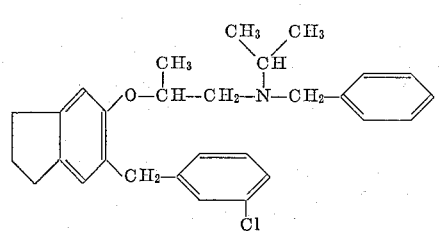

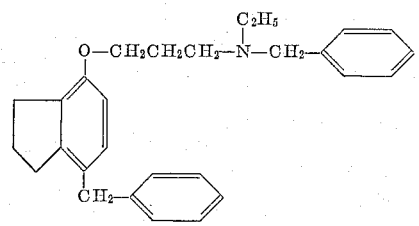

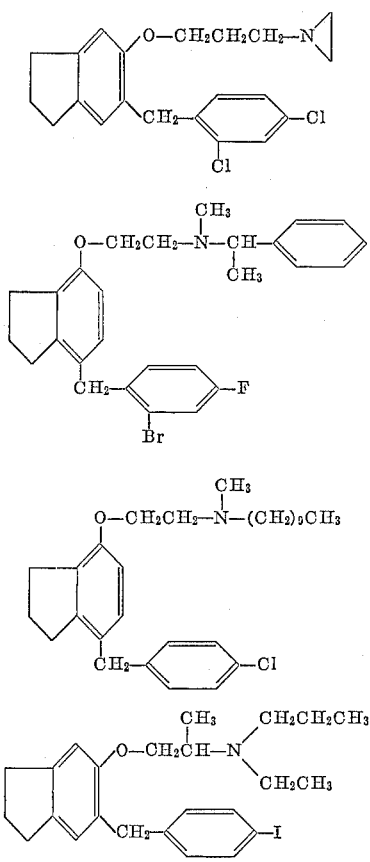

Additional illustrative embodiments of this invention will be manifest from the examples and tables which follow.

EXAMPLE I

*7-Benzyl-4-Indanol*

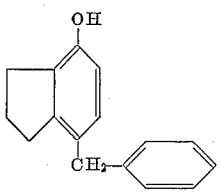

A solution of 100 g. (0.74 mole) of 4-indanol, 62.8 g. (0.496 mole) of benzyl chloride, and 32 g. of freshly fused anhydrous zinc chloride in 400 ml. of chloroform was stirred and refluxed for 12 hours. The cooled reaction mixture was washed with 1.6 liters of water, and the chloroform phase separated; dried over anhydrous magnesium sulfate; filtered, and subjected to fractional vacuum distillation. After removal of chloroform and unreacted 4-indanol, 7-benzyl-4-indanol was obtained, B.P. 140–8° C./0.1 mm.; M.P. 111–3° C.

EXAMPLE II

*6-(p-Chlorobenzyl)-5-Indanol*

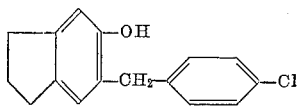

A solution of 12.5 g. (0.093 mole) of 5-indanol, 10 g. (0.062 mole) of p-chlorobenzylchloride and 4 g. of freshly fused anhydrous zinc chloride was reacted as described under Example I. Upon distillation, 6-p-chlorobenzyl-5-indanol was obtained, B.P. 138° C./ 0.05 mm.; M.P. 73–4° C.

EXAMPLE III

*2-(1-Hexamethylenimyl)Ethyl Ether of 6-Benzyl-4-Indanol and Methiodide Thereof*

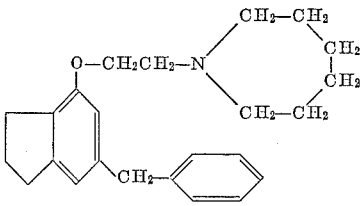

and

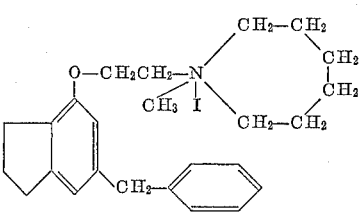

A solution of 50 g. (0.51 mole) of hexamethylenimine and 29 g. (0.36 mole) of ethylene chlorohydrin in 125 ml. of toluene was stirred and refluxed for 2 hours. Upon cooling, the formed hexamethylenimine hydrochloride (26.4 g.) was separated and the filtrate, after removal of volatiles, was distilled in vacuo. 2-(1-hexamethylenimyl) ethyl alcohol was obtained, B.P. 80–8° C./8 mm.

To a cooled solution of 30 ml. of thionyl chloride in 100 ml. of benzene there was added with continued cooling and stirring (10° C.) 25 g. (0.175 mole) of 2-(1-hexamethylenimyl)ethyl alcohol. After the addition was complete (30 minutes) the reaction mixture was refluxed for 2 hours; the volatiles removed in vacuo, and the residue dissolved in water. The aqueous solution was washed with ether and then the aqueous phase made alkaline with 40% sodium hydroxide solution and extracted with two 200 ml. portions of ether. The combined ether extracts were dried over anhydrous magnesium sulfate; filtered; the ether evaporated, and the residue distilled in vacuo. 2-(1-hexamethylenimyl)ethyl chloride was obtained, B.P. 80–2° C./0.1 mm.

This product (0.045 mole) was dissolved in 60 ml. of ethanol, and added slowly to a solution of 4.02 g. (0.03 mole) of 4-indanol in 2.6 g. (0.045 mole) of potassium hydroxide in 25 ml. of ethanol and 14 ml. of water, with cooling (10° C.). The reaction mixture was stirred and refluxed for 3 hours; cooled, filtered, and volatiles removed in vacuo. The residue was suspended in 100 ml. of water and extracted with three 100 ml. portions of ether. The combined ethereal extracts were extracted with two 60 ml. portions of 3 N hydrochloric acid. The acid phase was separated, made strongly alkaline with 40% sodium hydroxide solution and the product extracted with two 100 ml. portions of ether. The combined ether extracts were dried over anhydrous magnesium sulfate; the ether evaporated, and the residual oil distilled.

The methiodide quaternary salt was prepared by treating 2.0 g. of the above base in 12 ml. of acetonitrile with 15 ml. of methyl iodide. After standing three hours, 25 ml. of ethyl acetate and 15 ml. of ether were added and the reaction mixture was allowed to crystallize at 10° C. over thirteen hours. On filtration and rinsing

EXAMPLE IV

*(3-[1-Piperidinyl]Propyl)Ether of (7-o-Chlorobenzyl)-4-Indanol*

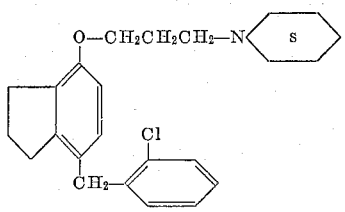

A solution of 6.47 g. (0.025 mole) of (7-o-chlorobenzyl)-4-indanol in a solution of 4.2 g. (0.075 mole) of potassium hydroxide in 50 ml. of ethanol and 13 ml. of water was reacted with 5.95 g. (0.037 mole) of (3-[1-piperidinyl]propyl) chloride in 50 ml. of ethanol. The reaction mixture was stirred and refluxed for 3 hours; cooled; filtered, and volatiles removed in vacuo. The residue was suspended in 100 ml. of water and extracted with three 100 ml. portions of ether. The combined ethereal extracts were extracted with two 60 ml. portions of 3 N hydrochloric acid. The acid phase was separated, made strongly alkaline with 40% sodium hydroxide solution and the product extracted with two 100 ml. portions of ether. The combined ether extracts were dried over anhydrous magnesium sulfate; the ether evaporated, and the residual oil distilled. The product obtained boiled at 178–94° C./0.04 mm.

EXAMPLE V

*(3-Dimethylamino Propyl)Ether of 7-Benzyl-4-Indanol; the Methiodide, and Other Quaternary Salts*

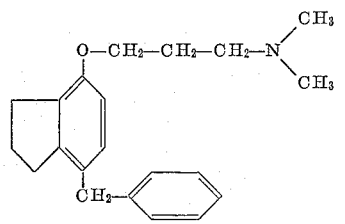

and

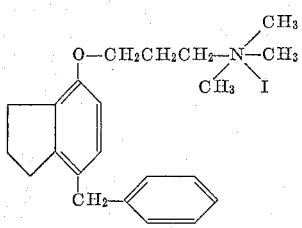

A solution of 11.2 g. (0.05 mole) of 7-benzyl-4-indanol in a solution of 8.4 g. of potassium hydroxide in 100 ml. of ethanol and 25 ml. of water was reacted with 11.85 g. (0.075 mole) of dimethylaminopropylchloride hydrochloride in 100 ml. of ethanol and treated as described under Example IV. The product obtained boiled at 162–70° C./0.1 mm.

The methiodide quaternary salt was prepared by treating 2.0 g. of the above base in 12 ml. of acetonitrile with 15 ml. of methyl iodide. After standing three hours, 25 ml. of ethyl acetate and 15 ml. of ether were added and the reaction mixture was allowed to crystallize at 10° C. over thirteen hours. On filtration and rinsing of the precipitate with ether, the methiodide was obtained. It melted at 195–8° C.

The ethyl bromoacetate quaternary salt was prepared by treating 2 g. of the base above in 12 ml. of the acetonitrile with 15 ml. (excess) of ethyl bromoacetate. After standing twenty-four hours the reaction mixture was diluted with 25 ml. of ether and stored at 10° C. for 24 hours. The formed crystals were separated and after recrystallization from butyl acetate had a M.P. 146–52° C.

The allyl bromide quaternary salt was prepared in the manner of the methiodide, and melted at 98–102° C. The analysis showed that it was a hydrate.

EXAMPLE VI

*(3-Dimethylaminopropyl)Ether of (6-p-Chlorobenzyl)-5-Indanol, Acid Salts, and Quaternary Salts*

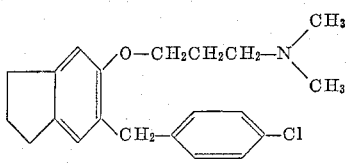

A solution of 25.9 g. (0.1 mole) of (6-p-chlorobenzyl)-5-indanol and 16.8 g. (0.3 mole) of potassium hydroxide in a solution of 200 ml. of ethanol and 50 ml. of water was reacted with a solution 23.7 g. (0.15 mole) of dimethylaminopropylchloride hydrochloride in 200 ml. of ethanol, and treated as described in Example IV. The product obtained boiled at 180° C./0.03 mm.

The hydrochloride was prepared from a solution of 2.5 g. of the base in 4.65 ml. of 1.54 N hydrochloric acid. After standing one hour, the hydrochloride formed was crystallized from methanol-ethyl acetate melting at 215–7° C.

The methiodide quaternary salt was prepared from 2.0 g. of the above base following the procedure of Example V. It melted at 183–5° C.

The ethyl bromoacetate quaternary salt was prepared from the base above following the procedure of Example V. It has the structure:

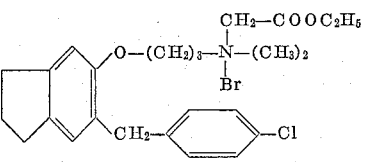

It melted at 177–8° C.

The allyl bromide quaternary salt was prepared from the base above following the procedure of Example V, and melted at 136–8° C.

The dialkylaminoalkylethers of indanols of this invention are usually high boiling liquids, although some of high molecular weight are solids. The acid addition salts, especially the hydrochlorides, and the quaternary ammonium salts are stable, crystalline, generally water-soluble, and ether- and benzene-insoluble.

Typical compounds illustrative of the invention are given in Tables I and II. These compounds can be prepared by synthesis in accordance with the examples presented above.

Table I represents physical constants and characterizations of compounds derived from 4-indanol, Table II the same for quaternary salts of the compounds of Table I, Table III represents constants and characterizations of compounds derived from 5-indanol, and Table IV the same for quaternary salts of the compounds of Table III. It will be understood that the description, and the specific compounds listed in the tables and in the above examples, are illustrative only, and that they may be varied or modified without departing from the spirit of the invention or sacrificing the advantage thereof, and therefore the invention is not to be limited to the specific embodiments herein set forth.

TABLE I.—DIALKYLAMINOALKYLETHERS OF 7-BENZYL-4-INDANOLS

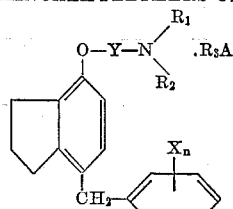

| Example No. | Benzyl | R₁ | R₂ | Y | B.P., °C./mm. Pressure |
|---|---|---|---|---|---|
| 1 | ⟨phenyl⟩—CH₂— | (CH₃)₂—CH— | CH₃— | —CH₂CH₂— | 168–80/0.12 |
| 2 | ⟨phenyl⟩—CH₂— | (CH₃)₂—CH— | CH₃— | —CH₂CH₂— | |
| 3 | ⟨phenyl⟩—CH₂— | —(CH₂)₆— | | —CH₂CH₂— | 200–10/0.45 |
| 4 | ⟨phenyl⟩—CH₂— | CH₃— | CH₃— | —CH₂CH₂CH₂— | 162–70/0.1 |
| 5 | ⟨phenyl⟩—CH₂— | CH₃— | CH₃— | —CH₂CH₂CH₂— | |
| 6 | ⟨phenyl⟩—CH₂— | CH₃— | CH₃— | —CH₂CH₂CH₂— | |
| 7 | ⟨phenyl⟩—CH₂— | CH₃— | CH₃— | —CH₂CH₂CH₂— | |
| 8 | ⟨2-Cl-phenyl⟩—CH₂— | CH₃— | CH₃— | —CH₂CH₂CH₂— | 162–73/0.035 |
| 9 | ⟨2-Cl-phenyl⟩—CH₂— | CH₃— | CH₃— | —CH₂CH₂CH₂— | |
| 10 | ⟨2-Cl-phenyl⟩—CH₂— | CH₃— | CH₃— | —CH₂CH₂CH₂— | |
| 11 | ⟨2-Cl-phenyl⟩—CH₂— | CH₃— | CH₃— | —CH₂CH₂CH₂— | |
| 12 | ⟨2-Cl-phenyl⟩—CH₂— | —(CH₂)₅— | | —CH₂CH₂CH₂— | 178–94/0.04 |
| 13 | Cl—⟨phenyl⟩—CH₂— | C₂H₅— | C₂H₅— | —CH₂CH₂— | 164–76/0.06 |
| 14 | Cl—⟨phenyl⟩—CH₂— | C₂H₅— | C₂H₅— | —CH₂CH₂— | |
| 15 | Cl—⟨phenyl⟩—CH₂— | (CH₃)₂—CH— | CH₃— | —CH₂CH₂— | 186–96/0.025 |
| 16 | Cl—⟨phenyl⟩—CH₂— | (CH₃)₂—CH— | CH₃— | —CH₂CH₂— | |
| 17 | Cl—⟨phenyl⟩—CH₂— | —(CH₂)₆— | | —CH₂CH₂— | 206–10/0.18 |
| 18 | Cl—⟨phenyl⟩—CH₂— | —(CH₂)₆— | | —CH₂CH₂— | |
| 19 | Cl—⟨phenyl⟩—CH₂— | ⟨phenyl⟩—CH₂CH₂—* | | —CH₂CH₂— | 256–8/0. |
| 20 | Cl—⟨phenyl⟩—CH₂— | CH₃— | CH₃— | —CH₂CH₂CH₂— | 186–90/0.3 |

See footnote at end of table.

TABLE I.—DIALKYLAMINOALKYLETHERS OF 7-BENZYL-4-INDANOLS—Continued

| Example No. | Benzyl | $R_1$ | $R_2$ | Y | B.P., °C./mm. Pressure |
|---|---|---|---|---|---|
| 21 | Cl-C₆H₄-CH₂- | $CH_3-$ | $CH_3-$ | $-CH_2CH_2CH_2-$ | |
| 22 | Cl-C₆H₄-CH₂- | $CH_3-$ | $CH_3-$ | $-CH_2CH_2CH_2-$ | |
| 23 | Cl-C₆H₄-CH₂- | $CH_3-$ | $CH_3-$ | $-CH_2CH_2CH_2-$ | |
| 24 | Cl-C₆H₄-CH₂- | $-(CH_2)_5-$ * | | $-CH_2CH_2CH_2-$ | 186–204/0.14 |
| 24A | Cl,Cl-C₆H₃-CH₂- | $C_2H_5-$ | $C_2H_5-$ | $-CH_2CH_2-$ | 192–198/0.06 |
| 24B | Cl,Cl-C₆H₃-CH₂- | $CH_3-$ | $CH_3-$ | $-CHCH_3CH_2-$ | 193–200/0.11 |
| 24C | Cl,Cl-C₆H₃-CH₂- | $CH_3-$ | $CH_3-$ | $-CH_2CH_2CH_2-$ | 196–198/0.1 |
| 24D | Cl,Cl-C₆H₃-CH₂- | $C_2H_5-$ | $C_2H_5-$ | $-CH_2CH_2-$ | 200/0.24 |
| 24E | Cl,Cl-C₆H₃-CH₂- | $CH_3-$ | $CH_3-$ | $-CHCH_3CH_2-$ | 192–194/0.06 |
| 24F | Cl,Cl-C₆H₃-CH₂- | $CH_3-$ | $CH_3-$ | $-CH_2CH_2CH_2-$ | 186/0.08 |

*Indolino.

TABLE II.—QUATERNARY AMMONIUM SALTS OF COMPOUNDS OF TABLE I

| Example No. of Table I | $R_3$ | A | M.P., °C. |
|---|---|---|---|
| 2 | $CH_3-$ | I | 171–3 |
| 5 | $CH_3-$ | I | 195–8 |
| 6 | $CH_2=CH-CH_2-$ | Br | 81–4 |
| 7 | $C_2H_5O-CO-CH_2-$ | Br | 148–50 |
| 9 | $CH_3-$ | I | 192–4 |
| 10 | $CH_2=CH-CH_2-$ | Br | 81–4 |
| 11 | $C_2H_5O-CO-CH_2-$ | Br | 148–50 |
| 14 | H- | Cl | 134–6 |
| 16 | $CH_3-$ | I | 137–9 |
| 18 | $CH_3-$ | I | 198–220 |
| 21 | H- | Cl | 166–8 |
| 22 | $CH_3-$ | I | 254–6 |
| 23 | $C_2H_5O-CO-CH_2-$ | Br | 151–4 |

TABLE III.—DIALKYLAMINOALKYLETHERS AND DERIVED COMPOUNDS OF 5-INDANOLS

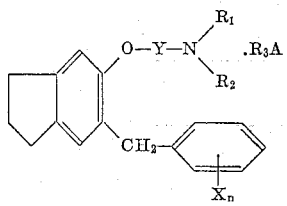

| Example No. | Benzyl | $R_1$ | $R_2$ | Y | B.P., °C./mm. Pressure |
|---|---|---|---|---|---|
| 25 | C₆H₅-CH₂- | $(CH_3)_2-CH-$ | $CH_3-$ | $-CH_2CH_2-$ | 188–92/0.8 |

TABLE III.—DIALKYLAMINOALKYLETHERS AND DERIVED COMPOUNDS OF 5-INDANOLS—Continued

| Example No. | Benzyl | $R_1$ | $R_2$ | Y | B.P., °C./mm. Pressure |
|---|---|---|---|---|---|
| 26 | C₆H₅–CH₂– | –CH₂–CH₂–CH₂–CH₂–CH₂–CH₂– (piperidinyl) | | –CH₂CH₂– | 196–201/0.08 |
| 27 | C₆H₅–CH₂– | –CH₂–CH₂–CH₂–CH₂–CH₂–CH₂– (piperidinyl) | | –CH₂CH₂– | |
| 28 | (2-Cl)C₆H₄–CH₂– | $CH_3$– | $CH_3$– | –CH₂CH₂CH₂– | 166–72/0.035 |
| 29 | (2-Cl)C₆H₄–CH₂– | $CH_3$– | $CH_3$– | –CH₂CH₂CH₂– | |
| 30 | (2-Cl)C₆H₄–CH₂– | $CH_3$– | $CH_3$– | –CH₂CH₂CH₂– | |
| 31 | (2-Cl)C₆H₄–CH₂– | $CH_3$– | $CH_3$– | –CH₂CH₂CH₂– | |
| 32 | (2-Cl)C₆H₄–CH₂– | –CH₂CH₂–CH₂–CH₂CH₂– (pyrrolidinyl/morpholinyl) | | –CH₂CH₂CH₂– | 180–6/0.015 |
| 33 | Cl–C₆H₄–CH₂– | $CH_3$– | $CH_3$– | –CH₂CH₂– | 160–6/0.25 |
| 34 | Cl–C₆H₄–CH₂– | $CH_3$– | $CH_3$– | –CH₂CH₂– | |
| 35 | Cl–C₆H₄–CH₂– | $C_2H_5$– | $C_2H_5$– | –CH₂CH₂– | 170–80/0.55 |
| 36 | Cl–C₆H₄–CH₂– | $C_2H_5$– | $C_2H_5$– | –CH₂CH₂– | |
| 37 | Cl–C₆H₄–CH₂– | $(CH_3)_2$–CH– | $CH_3$– | –CH₂CH₂– | 184–90/0.05 |
| 38 | Cl–C₆H₄–CH₂– | $(CH_3)_2$–CH– | $CH_3$– | –CH₂CH₂– | |
| 39 | Cl–C₆H₄–CH₂– | –CH₂–CH₂–CH₂–CH₂–CH₂–CH₂– (piperidinyl) | | –CH₂CH₂– | 210–14/0. |
| 40 | Cl–C₆H₄–CH₂– | | | –CH₂CH₂– | 242–52/0.22–0.26 |
| 41 | Cl–C₆H₄–CH₂– | $CH_3$– | $CH_3$– | –CH₂CH₂CH₂– | |
| 42 | Cl–C₆H₄–CH₂– | $CH_3$– | $CH_3$– | –CH₂CH₂CH₂– | |
| 43 | Cl–C₆H₄–CH₂– | $CH_3$– | $CH_3$– | –CH₂CH₂CH₂– | |
| 44 | Cl–C₆H₄–CH₂– | $CH_3$– | $CH_3$– | –CH₂CH₂CH₂– | |
| 45 | Cl–C₆H₄–CH₂– | –CH₂–CH₂–CH₂–CH₂–CH₂–CH₂– (piperidinyl) | | –CH₂CH₂CH₂– | 178–93/0.015 |

TABLE III.—DIALKYLAMINOALKYLETHERS AND DERIVED COMPOUNDS OF 5-INDANOLS—Continued

| Example No. | Benzyl | $R_1$ | $R_2$ | Y | B.P., °C./mm. Pressure |
|---|---|---|---|---|---|
| 46 | Cl—⟨⟩—CH₂— (Cl) | $C_2H_5$— | $C_2H_5$— | —CH₂CH₂— | 208–214/0.2 |
| 47 | Cl—⟨⟩—CH₂— (Cl) | $CH_3$— | $CH_3$— | CHCH₃CH₂— | 192/0.1 |
| 48 | Cl—⟨⟩—CH₂— (Cl) | $CH_3$— | $CH_3$— | —CH₂CH₂CH₂— | 200/0.1 |
| 49 | Cl—⟨⟩—CH₂— (Cl) | $C_2H_5$— | $C_2H_5$— | —CH₂CH₂— | 214–218/0.5 |
| 50 | Cl—⟨⟩—CH₂— (Cl) | $CH_3$— | $CH_3$— | —CHCH₃CH₂— | 188–194/0.1 |
| 51 | Cl—⟨⟩—CH₂— (Cl) | $CH_3$— | $CH_3$— | —CH₂CH₂CH₂— | 204–206/0.15 |

TABLE IV.—QUATERNARY SALTS OF COMPOUNDS OF TABLE III

| Example No. of Table III | $R_3$ | A | M.P. °C. |
|---|---|---|---|
| 27 | $CH_3$— | I | 127 |
| 29 | $CH_3$— | I | 257–9 |
| 30 | $CH_2=CH—CH_2$— | Br | 140–6 |
| 31 | $C_2H_5O—CO—CH_2$ | Br | 144–7 |
| 34 | H— | Cl | 165–6 |
| 36 | H— | Cl | 147–8 |
| 38 | $CH_3$— | I | 138–40 |
| 41 | H— | Cl | 215–7 |
| 42 | $CH_3$— | I | 183–5 |
| 43 | $CH_2=CH—CH_2$— | Br | 136–8 |
| 44 | $C_2H_5O—CO—CH_2$ | Br | 177–8 |

TABLE V.—TERTIARY AMINO ALCOHOLS $$R_1 \diagdown N—(CH_2)_n—OH \diagup R_2$$

| $R_1$ | $R_2$ | $n$ | Reference or B.P., °C./mm. Pressure |
|---|---|---|---|
| $(CH_3)_2$—CH— | $CH_3$— | 2 | Biel, J. Am. Chem. Soc. 71: 1306 (1949). |
| ⟨⟩—CH₂— | $CH_3$— | 2 | Mannich et al. Archiv fur Pharmazie 250: 542 (1913). |
| —(CH₂)₄— | | 2 | von Braun et al., Berichte 55B: 1666 (1922). |
| —(CH₂)₅— | | 2 | Ladenburg, Berichte 14: 1877. |
| —(CH₂)₂—O—(CH₂)₂ | | 2 | Gardner et al., Am. Chem. Soc. 53: 2763 (1931). |
| —(CH₂)₆— | | 2 | 80–8/8. |
| ⟨⟩—CH₂CH₂—* | | 2 | 101–2/0.1. |
| —(CH₂)₅ | | 3 | von Braun et al., Berichte 55B: 1666 (1922). |

*Indolino.

The reactant, dialkylaminoalkyl halide, where not commercially available, was prepared by known reactions. A secondary amine, condensed with a halohydrin such as 2-chloroethanol or 3-bromopropanol, and the like, gives a tertiary aminoalcohol. The aminoalcohol in turn is converted to the dialkylaminoalkyl halide by treatment with thionyl chloride. Details relative to these intermediates are given in Tables V and VI.

TABLE VI.—TERTIARY AMINOALKYL CHLORIDES $$R_1 \diagdown N—(CH_2)_n—Cl \diagup R_2$$

| $R_1$ | $R_2$ | $n$ | Reference or B.P., °C./mm. Pressure |
|---|---|---|---|
| $(CH_3)_2$—CH— | $CH_3$— | 2 | Wright et al., J. Am. Chem. Soc. 72: 3536 (1950). |
| ⟨⟩—CH₂— | $CH_3$— | 2 | Wright et al., J. Am. Chem. Soc. 72: 3536 (1950). |
| —(CH₂)₄— | | 2 | Wright et al., J. Am. Chem. Soc. 70: 3098 (1948). |
| —(CH₂)₅— | | 2 | Knorr et al., Berichte 38: 3138. |
| —(CH₂)₂—O—(CH₂)₂— | | 2 | Mason et al., J. Am. Chem. Soc. 62: 1443 (1940). |
| —(CH₂)₆— | | 2 | 80–2/10. |
| —(CH₂)₅— | | 3 | Gabriel et al., Berichte 39: 2886. |

The novel compounds possess various physiological properties including tranquillizing effects, hypotensive effects, anti-inflammatory action, ganglionic blocking, antihistamine and anticholinergic properties. These compounds also exhibit their usefulness as drug-prolonging agents when administered in conjunction with the drug whose action is to be prolonged. Their sterically restricted five-membered ring coupled with the dialkyl-aminoalkoxy fragment and attached to the benzene ring, appears to impart a markedly effective spectrum of physiological responses within the framework of structural variation provided by this invention.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therewithin.

This application is a continuation-in-part of Serial No. 637,636, filed on February 1, 1957, now abandoned.

We claim:

1. Compounds selected from the group consisting of disubstituted aminoethers of indanols having a formula selected from the group consisting of:

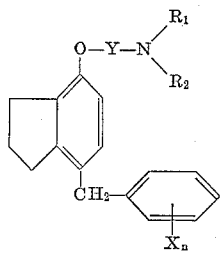

and

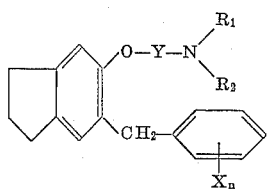

the non-toxic pharmacologically acceptable acid salts thereof, and the non-toxic pharmacologically acceptable quaternary ammonium salts thereof having a formula selected from the group consisting of:

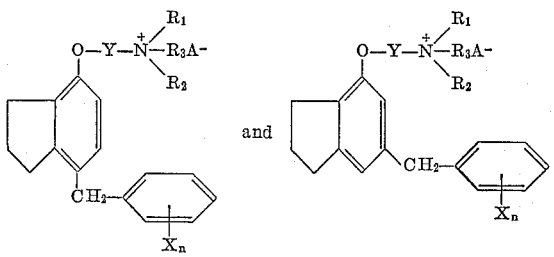

wherein X is halogen; $n$ is an integer of from 0 to 5; $R_1$ and $R_2$ are selected from the group consisting of alkyl having from 1 to 10 carbon atoms, benzyl, alpha-phenethyl, cyclopentyl, cyclohexyl, and cycloheptyl, and $R_1$ and $R_2$ together with the nitrogen atom to which they are attached are selected from the group consisting of 1-piperidino, 2-methyl-1-piperidino, 1-pyrrolidino, 1-hexamethylenimino, 4-morpholino, 1-indolino and tetrahydroisoquinolino; Y is a bivalent alkylene group having from 2 to 3 carbon atoms; $R_3$ is selected from the group consisting of alkyl having from 1 to 8 carbon atoms, allyl, benzyl and carboethoxymethyl; and A is a non-toxic anion.

2. Disubstituted aminoethers of indanols having the formula

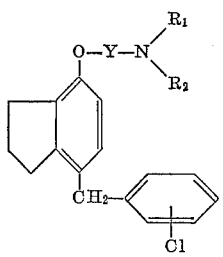

wherein Y is a bivalent alkylene group having from 2 to 3 carbon atoms and $R_1$ and $R_2$ are alkyl having from 1 to 10 carbon atoms.

3. Disubstituted aminoethers of indanols having the formula

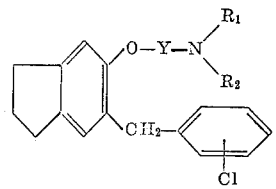

wherein Y is a bivalent alkylene group having from 2 to 3 carbon atoms and $R_1$ and $R_2$ are alkyl having from 1 to 10 carbon atoms.

4. Disubstituted aminoethers of indanols having the formula

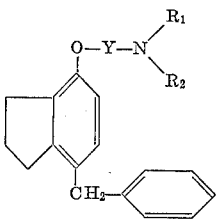

wherein Y is a bivalent alkylene group having from 2 to 3 carbon atoms and $R_1$ and $R_2$ are alkyl having from 1 to 10 carbon atoms.

5. Disubstituted aminoethers of indanols having the formula

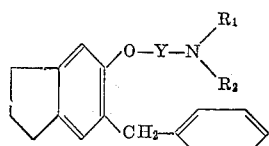

wherein Y is a bivalent alkylene group having from 2 to 3 carbon atoms and $R_1$ and $R_2$ are alkyl having from 1 to 10 carbon atoms.

6. The compound having the following formula

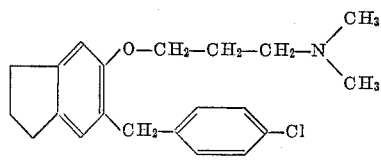

7. The compound having the following formula

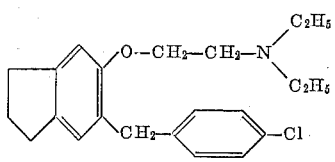

8. The compound having the following formula

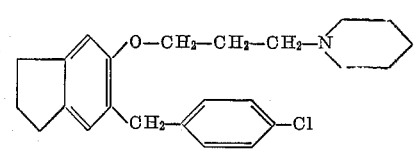

References Cited in the file of this patent
UNITED STATES PATENTS
2,820,817   Sam _____ Jan. 21, 1958